United States Patent [19]

Keller

[11] Patent Number: 4,730,760
[45] Date of Patent: Mar. 15, 1988

[54] TRAY FOR AUTO PASSENGER COMPARTMENTS

[76] Inventor: Karen S. Keller, 929 N. 77th St., Seattle, Wash. 98103

[21] Appl. No.: 916,893

[22] Filed: Oct. 8, 1986

[51] Int. Cl.⁴ .............................................. B60R 7/00
[52] U.S. Cl. .................................... 224/273; 224/148; 224/275; 224/42.42; 108/46; 108/18; 206/557
[58] Field of Search ............. 224/273, 42.42 R, 42.43, 224/42.44, 148, 275; 108/11, 18, 44, 46; 206/557

[56] References Cited

U.S. PATENT DOCUMENTS 4,010,696 3/1977 Priesman ...................... 224/42.42 R

FOREIGN PATENT DOCUMENTS 1115669 1/1982 Canada ......................... 224/42.42 R Primary Examiner—Houston S. Bell, Jr.
Attorney, Agent, or Firm—John R. Benefiel

[57] ABSTRACT

A tray for auto passenger compartments, in which a bracket is mounted at one end of a tray member, the bracket received in a slot recess extending into the one end of the tray member. The bracket sections form a hook-shaped portion with an end section adapted to be received into a window recess. The end of the tray is positioned against the door surface when the bracket is hooked to support the tray member, and an in-and-out adjustment of the bracket in the recess slot accommodates differing door configurations. The bracket sections are hinged together to allow folding for storage.

10 Claims, 3 Drawing Figures

TRAY FOR AUTO PASSENGER COMPARTMENTS

FIELD OF THE INVENTION

This invention concerns trays for food serving and other uses and more particularly trays adapted to be hooked to an auto door window recess to be supported within the interior of automobile passenger compartments.

BACKGROUND OF THE INVENTION

It has been known to provide serving trays mounted inside auto passenger compartments by being hooked on a door window recess.

Such trays have typically been bottom supported by means of an adjustable brace extending to engage the door panel surface, adjustment of the brace enabling adaption to different door panel configurations. Such braces present an inconvenient obstruction beneath the tray, hindering movement within the close confines of the typical auto.

Typically, such trays have been of a cumbersome and bulky design, clumsy to handle and taking up excessive storage space.

Accordingly, it is an object of the present invention to provide a hook-on tray for food serving or other purposes, adapted to engage the window recess in an auto door, which is adjustably supported without a bottom brace on varying door configurations.

It is another object to provide such a tray which is foldable into a minimum volume, and free from protruding obstructions so as to be easily handled and stored in a minimum space.

SUMMARY OF THE INVENTION

These and other objects of the present invention which will become apparent upon a reading of the following claims are provided by a tray supported by a hooked-shaped bracket formed by a series of sections having a terminal end section receivable in an auto side window recess with a lower attached bracket section extending beneath the tray to position the hook-shaped bracket sections extending above and away from one end of the tray.

The tray is formed with a central slot recess accommodating in and out adjustment movement of the bracket, which enables level support of the tray against various auto door configurations by positioning the one end of the tray abutting against the door panel surface.

The various bracket sections are joined by hinges which will open to a maximum 90° position to enable the bracket to be folded down flat atop the tray for minimum storage space, while providing a rigid hook-shape when unfolded.

The tray is preferably formed with a rounded configuration at the free unsupported end.

The tray preferably also provides for three point support of beverage cans by locating a curved protrusion at one or more corners of a peripheral tray rim, which creates a space sized to engage and support beverage cans while minimizing obstruction of the tray surface.

DETAILED DESCRIPTION

Figure 1:
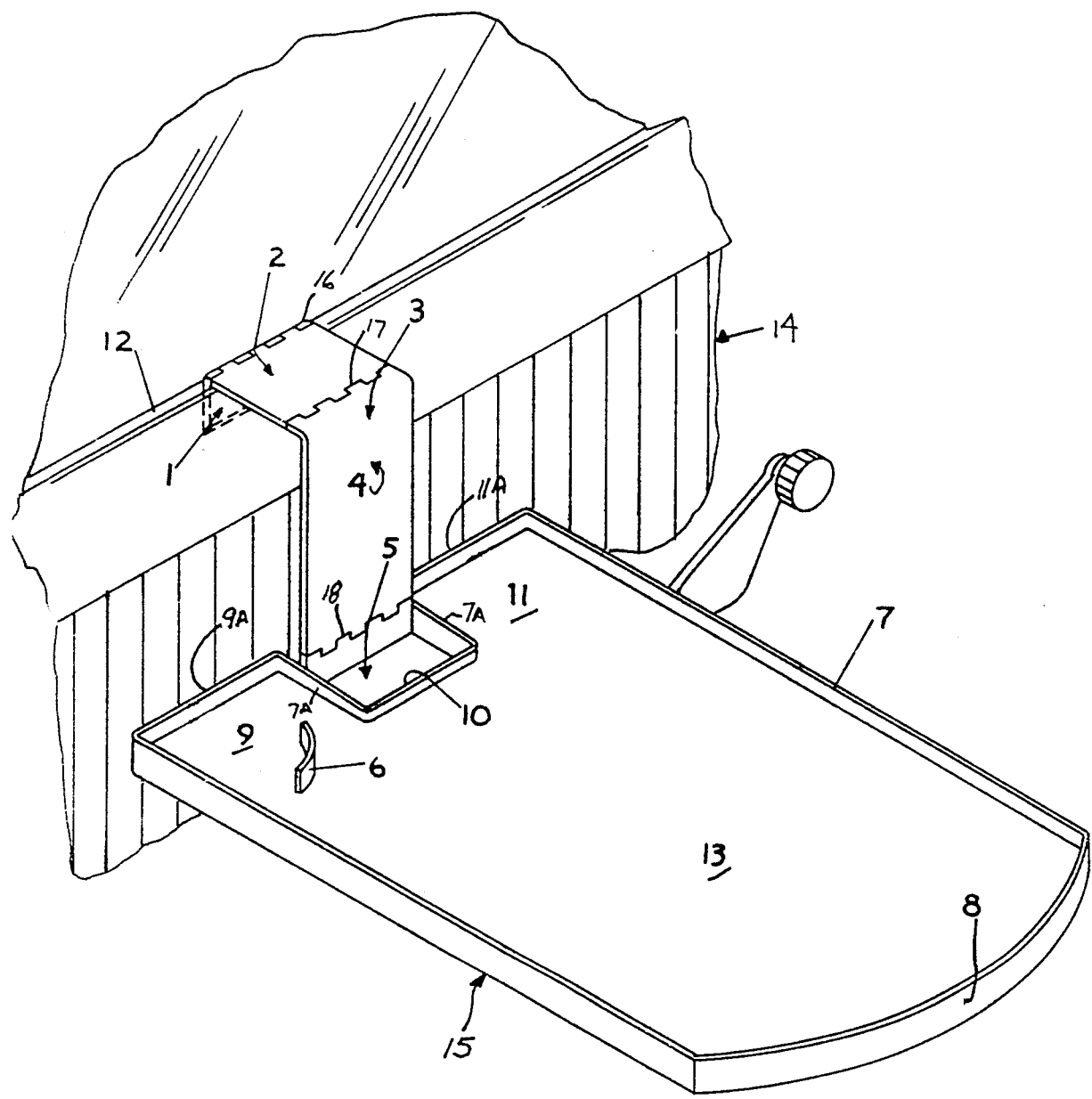
FIG. 1 is an isometric view of the tray assembly mounted on a typical interior automobile door.
Figure 2:
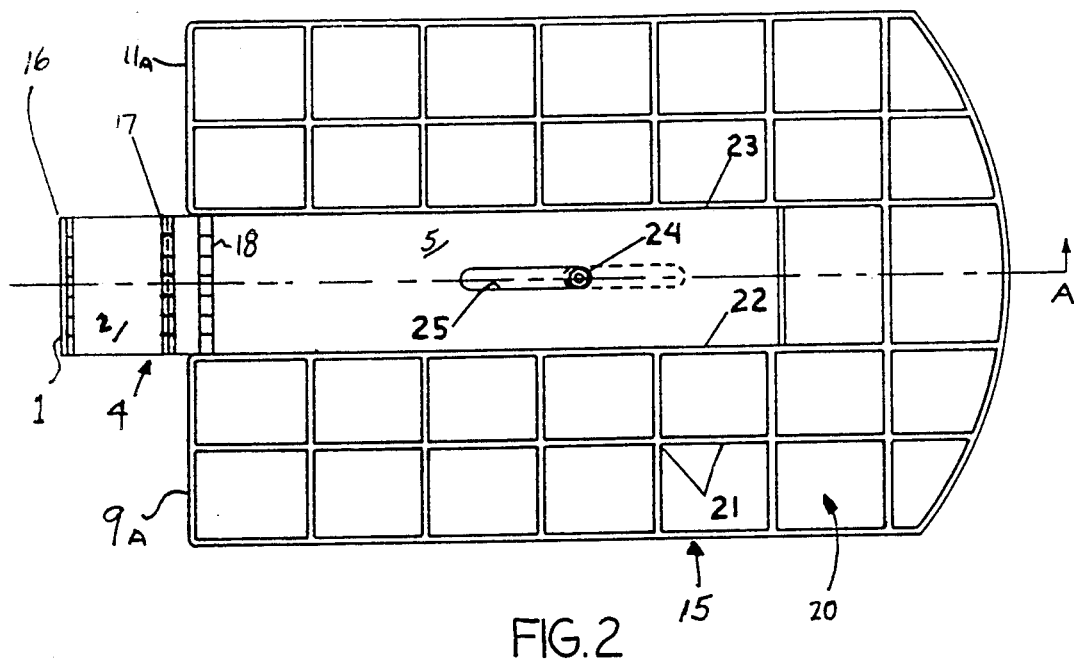
FIG. 2 is a bottom view of the tray and bracket assembly illustrating the sliding movement of the bracket.
Figure 3:
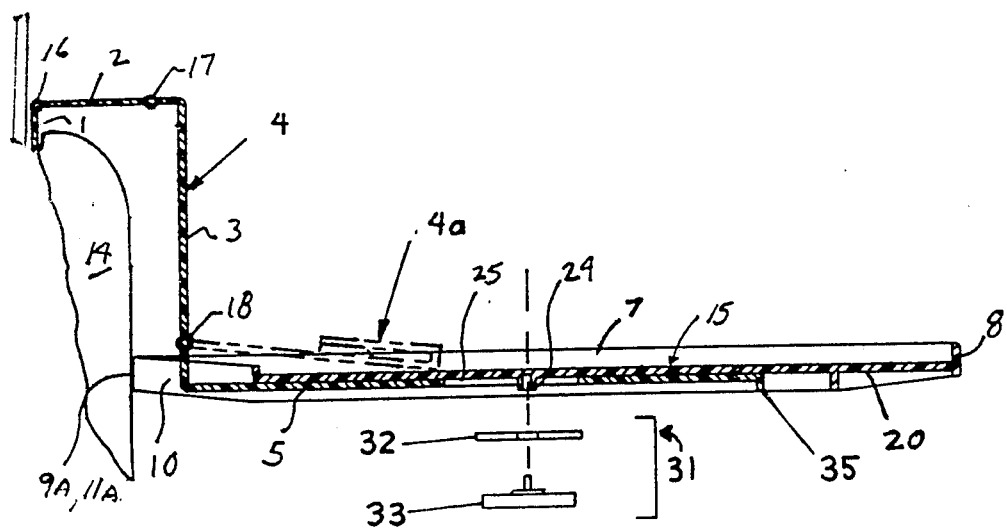
FIG. 3 is a sectional view of the bracket, tray and securing assembly illustrating the folding movement of the bracket.

As shown in FIGS. 1-3, in the tray according to the present invention is comprised of a generally planar tray member 15 having an upper support surface 13, a bracket 4, and a securing assembly 32. All pieces are preferably molded from a suitable plastic, such as ABS.

FIG. 1 shows the tray according to the present invention mounted on the interior of a typical automobile door 14. The tray member 15 is generally rectangular in shape with the free unsupported end 8 configured rounded to provide a trim shape for minimum interference with movements of user.

A slot recess 10 extends into the supported end of the tray support member 5 forming rectangular regions 9 and 11 on either side of slot recess 10. The slot recess 10 is slightly larger in width than the width of the bracket 4 and accommodates in and out adjustment movement of the bracket 4.

The tray surface 13 is generally flat, with a continuous vertical rim 7 which is perpendicular to the tray surface 13 and has a rounded top edge with a radius equal to its width. The rim 7 thus frames the perimeter of the tray member 15, tending to confine items on the tray surface 13. The rim 7 tapers down in section 7A along the slot recess 10 to allow clearance for the bracket 4 when folded for storage, as shown in FIG. 3.

Extending upwardly from the tray surface 13, is a curved protrusion 6 located in the region 9 of the tray 15 located on one side of the slot recess 10.

The curved protrusion has an inside diameter tangent to each of the corner walls, and sized to receive a typical beverage can, creating a three point holder to assist in retaining the typical beverage can in the upright position on the tray surface 13.

The bracket 4 is mounted centrally to one end of the tray member 15, aligned with the recess 10 and is made up of four injection molded plastic (ABS) sections 1, 2, 3, 5, hinged together at three points 16, 17, 18. All hinges 16, 17, 18 are designed to stop when opened to 90° to form a rigid hook-shaped bracket, but so placed as to allow folding to reduce the space required for storage and packing. As shown in FIG. 3, section 2 extends horizontally to vertical section 1, which extends downwardly, those sections together forming a generally hook-shaped bracket 4. As noted, the sections 1, 2, 3 may be collapsed and folded for storage.

The end section 1 of the bracket 4 is chamfered to be easily fit into the window recess 12 of a typical interior automobile door 14, without any hindrance to operation of the window or special modification to the typical automobile.

The tray support section 5 of the bracket 4 extends beneath the tray member 15 to support the same with a flange 35 located at the end of the bottom sections of the bracket 4 to allow easy grasping for in-and-out adjusting of the bracket 4 in the slot recess 10.

The bracket 4 is completely received within the slot 10 to position the ends 9A and 11A of sections 9 and 11 of the tray member 15 against the inside surface of the door 14 such that the tray member 15 is supported horizontally in a level attitude without the need for a bracing member. The in-and-out adjustment of the bracket 4 in recess 10 allows accommodation to varying door thicknesses and configurations to ensure a level support of the tray member 15 in most automobiles.

The bottom 20 of the tray member is made up of stiffening ribs 21 running lengthwise as well as across the underside. There are no ribs located in the middle third region receiving bracket section 5. The two adjacent lengthwise extending ribs 22, 23 thus form a track for the support section 5 to slide in and out without moving sideways.

Protruding from the bottom 20 of the tray is a circular boss 24 comprising the female end of the securing assembly 31. The circular boss 24 extends through a lengthwise slot 25 formed in the bottom section 5 of the bracket 4. The slot 25 in the bracket arm is slightly wider than the circular boss 24, allowing the in-and-out sliding motion of the bracket 4. The securing assembly 31 is fastened by a large circular shaped bolt 33 received in a threaded bore in boss 24, bolt 33 working in conjunction with a round washer spacer 32 when tightened to secure the bracket 4 in any adjusted bracket position.

Accordingly, a simply configured tray is provided which eliminates bulky, in-the-way bracing while being readily adaptable to being firmly supported in a level position on varying auto door interior configurations. The tray itself is sturdy, and trim and aesthetically pleasing in appearance, allowing bracing of beverage containers on its surface with a minimum of surface clutter.

I claim:

1. A tray adapted to be supported at one end on a door panel extending into an auto passenger compartment, said door of the type having a window recess, comprising:

a generally planar, rectangular tray member;

a bracket mounted on said one end of said tray member having a generally hook-shaped portion extending above and facing away from said tray member with a downwardly bent end section thereof insertable in said window recess, said bracket having a bottom section connected to said hook portion to extend beneath said tray member;

a slot recess extending lengthwise into said one end of said tray member and receiving said bottom section of said bracket, said slot recess opening through said tray member so as to allow in-and-out movement of said hook shaped portion of said bracket therein, said bracket able to be adjusted in said slot to dispose the one end of said tray member against the surface of said door with said hook-shaped portion end section inserted in said window recess; and securement means for securing said bracket in any adjusted position in said slot recess, whereby said tray member may be supported in a level attitude by doors of varying configurations.

2. The tray according to claim 1 wherein said bracket sections forming said hook-shaped portion include a normally vertical section attached to said bottom section, a horizontal section attaching said vertical section to said downwardly bent end section.

3. The tray according to claim 2 wherein said bracket sections are hinged together to allow folding together and down against said tray member thereof for storage thereof.

4. The tray according to claim 2 wherein said slot recess includes a guide track formed on the bottom of said tray member slidably receiving said bottom section of said bracket.

5. The tray according to claim 1 wherein the other end of said tray member is curved.

6. The tray according to claim 1 wherein said tray member is formed with a rim extending above the surface thereof and wherein at least one corner is formed by said rim, further including a curved protrusion located at said corner having an inside diameter tangent to the inside of said rim at said corner to provide a three point support for circular items.

7. The tray according to claim 6 wherein said inside diameter is sized to accept beverage cans.

8. The tray according to claim 1 wherein said bottom section of said bracket is formed with a lengthwise slot, and said tray member has a downward extending protrusion extending through said slot, said protrusion having a threaded bore forward thereon and further including a threaded bolt received in said threaded bore in said protrusion.

9. The tray according to claim 4 wherein a plurality of stiffener ribs extend from the bottom of said tray member, and wherein two of said ribs form said guide track.

10. The tray according to claim 3 wherein a rim extends around the periphery of said tray member, and said slot recess, said rim tapered down along said recess to accommodate said folding down of said bracket.

* * * * *